United States Patent
Yoo (10) Patent No.: US 12,530,312 B2
(45) Date of Patent: Jan. 20, 2026

(54) MULTIPLEXED DATA TRANSMISSION METHOD BETWEEN ENTITIES AND ELECTRONIC APPARATUS USING THE SAME

(71) Applicant: SK hynix Inc., Gyeonggi-do (KR)

(72) Inventor: Hee Nam Yoo, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 71 days.

(21) Appl. No.: 18/396,703

(22) Filed: Dec. 27, 2023

(65) Prior Publication Data

US 2025/0013601 A1  Jan. 9, 2025

(30) Foreign Application Priority Data

Jul. 7, 2023  (KR) .................. 10-2023-0088219

(51) Int. Cl.
*G06F 13/42* (2006.01)
*G06F 13/38* (2006.01)

(52) U.S. Cl.
CPC ........ *G06F 13/4291* (2013.01); *G06F 13/387* (2013.01)

(58) Field of Classification Search
None
See application file for complete search history.

(56) References Cited

U.S. PATENT DOCUMENTS

| | | | | |
|---|---|---|---|---|
| 2005/0018480 | A1* | 1/2005 | Choi | G11C 16/26 365/185.01 |
| 2021/0134336 | A1 | 5/2021 | Na et al. | |
| 2022/0199131 | A1* | 6/2022 | Kim | G11C 7/109 |
| 2023/0409202 | A1* | 12/2023 | Ootomo | G06F 3/0613 |
| 2024/0045958 | A1* | 2/2024 | Bunin | G06F 21/566 |
| 2024/0086087 | A1* | 3/2024 | Cheng | G06F 3/0625 |

FOREIGN PATENT DOCUMENTS

KR   10-2015-0040170 A   4/2015

* cited by examiner

*Primary Examiner* — Henry Tsai
*Assistant Examiner* — Dean Phan
(74) *Attorney, Agent, or Firm* — IP & T GROUP LLP (57) ABSTRACT

The present disclosure relates to a method for transmitting data between a first entity and a second entity, and a method for operating an electronic apparatus may include a method for operating an electronic apparatus, including: transmitting a first read enable signal indicating being ready to receive data to an external device; receiving a first data strobe signal indicating start of data transmission and a first data from the external device; receiving subsequent data after the first data from the external device; and receiving a second data strobe signal indicating end of the data transmission and a last data from the external device.

17 Claims, 8 Drawing Sheets

MULTIPLEXED DATA TRANSMISSION METHOD BETWEEN ENTITIES AND ELECTRONIC APPARATUS USING THE SAME

CROSS-REFERENCE TO RELATED APPLICATIONS

The present application claims the benefit 35 U.S.C. 119 (a) of Korea Patent Application No. 10-2023-0088219, filed Jul. 7, 2023, the entire contents of which are incorporated herein for all purposes by this reference.

FIELD

Various embodiments of the present disclosure relate to a multiplexed data transmission method between entities.

BACKGROUND

An electronic apparatus is an apparatus that performs an operation by using a plurality of chips included therein, for receiving or transmitting data from or to one another.

For example, a storage device is a device capable of storing data based on a request of an external device such as a computer, a mobile terminal (e.g., a smartphone, a tablet PC), or various electronic apparatuses. The storage device includes a plurality of memories and a memory controller for controlling the memories. The memory controller may store data in the memories or read data from the memories by transmitting control information to the memories.

In addition, the memory controller may read data from the memories, write/program data into the memories, or perform or control operations to erase data in the memories based on an input command that has been input by an external device. That is, the external device and the memory controller may perform an operation while transmitting and receiving information (e.g., a command and a message transmitted in response to the command) to and from each other.

An agreement being used for transmission between entities is referred to as a protocol (or standard/specification), and many protocols have been suggested and used depending on types of chips, types of data being transmitted, and data transmission rates. However, a method for transmitting data according to current protocols has a concern of consuming a large amount of power.

SUMMARY

Embodiments of the present disclosure are directed to providing a method for transmitting data, which is capable of minimizing use of a strobe signal to reduce power consumption during data transmission between entities.

The technical issues to be solved by the present disclosure are not limited to the above-mentioned technical issues, and other technical issues that are not mentioned will be clearly understood by ordinary-skilled persons in the art to which the present disclosure pertains from the following description.

According to embodiments of the present disclosure, an electronic apparatus may comprises a first terminal connected to a first conductive line and configured to transmit, to an external device, a read enable signal indicating whether data reception is available, a second terminal connected to a second conductive line and configured to transmit or receive, to or from the external device, a data strobe signal indicating start and end of data transmission, a third terminal connected to a third conductive line and configured to transmit or receive data to or from the external device; and an interface configured to control transmitting or receiving data to or from the external device, wherein the interface is configured to transmit, to the external device, a first read enable signal indicating whether the first terminal is ready to receive data, receive, from the external device, a first data strobe signal indicating start of data transmission through the second terminal and a first data through the third terminal at a same time, receive, from the external device, subsequent data after the first data through the third terminal, and receive, from the external device, a second data strobe signal indicating end of data transmission through the second terminal and a last data through the third terminal.

According to embodiments of the present disclosure, an electronic apparatus may comprises a first terminal connected to a first conductive line and configured to receive, from an external device, a read enable signal indicating whether data reception is available, a second terminal connected to a second conductive line configured to transmit or receive, to or from the external device, a data strobe signal indicating start and end of data transmission, a third terminal connected to a third conductive line and configured to transmit or receive data to or from the external device and an interface configured to control transmitting or receiving data to or from the external device, wherein the interface is configured to receive, from the external device a first read enable signal indicating whether the first terminal is ready to receive data, transmit, to the external device, a first data strobe signal indicating start of data transmission through the second terminal and a first data through the third terminal at a same time, transmit, to the external device, subsequent data after the first data through the third terminal, and transmit, to the external device, a second data strobe signal indicating end of data transmission through the second terminal and a last data through the third terminal.

According to embodiments of the present disclosure, an electronic apparatus may comprise a first entity configured to perform a first function, a second entity configured to perform a second function and a plurality of conductive lines connecting between the first entity and the second entity for data transmission, wherein the plurality of conductive lines comprise a first conductive line configured to transmit a read enable signal indicating whether data transmission is available, a second conductive line configured to transmit a data strobe signal indicating start and end of data transmission; and a third conductive line configured to transmit data, wherein the first entity is configured to transmit, to the second entity, a first read enable signal indicating whether the first conductive line is ready to receive data, receive, from the second entity, a first data strobe signal indicating start of data transmission through the second conductive line and a first data through the third conductive line, receive, from the second entity, subsequent data after the first data through the third conductive line and receive, from the second entity, a second data strobe signal indicating end of data transmission through the second conductive line and a last data through the third terminal, wherein the second entity is configured to receive, from the first entity, a first read enable signal indicating whether the first conductive line is ready to receive data, transmit, to the first entity, a first data strobe signal indicating start of data transmission through the second conductive line and a first data through the third conductive line, transmit, to the first entity, subsequent data after the first data through the third conductive line and transmit, to the first entity, a second data strobe signal indicating end of data transmission through the second conductive line and a last data through the third conductive line.

DETAILED DESCRIPTION

Hereinafter, embodiments of the present disclosure will be described in detail with reference to accompanying drawings.

Figure 1:
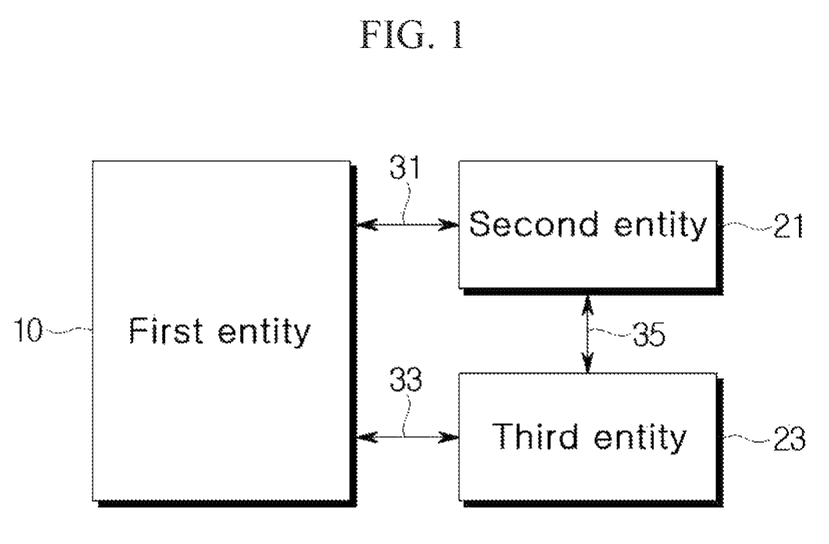
FIG. 1 is a diagram illustrating connections for data transmission between entities according to an embodiment of the present disclosure.

FIG. 1 is a diagram illustrating connections for data transmission between entities according to an embodiment of the present disclosure.

Referring to FIG. 1, an electronic apparatus may include a first entity 10, a second entity 21, and a third entity 23. The electronic apparatus may further include connections 31, 33 and 35 for data transmission among the entities 10, 21 and 23. The entities 10, 21 and 23 may include different types of apparatus. For example, the entities may include a digital camera and a memory which are connected using a connector. The entities may include host and storage device which are connected using a connector. Further, the entities may include a digital camera and two separate laptops connected with each other through a network.

In another embodiment, the entities may be two chips provided on a single substrate. For example, the entities may include a NAND flash memory provided inside a solid state drive (SSD) and a memory controller chip that controls the NAND flash memory, and the connections for data transmission between them may be implemented with conductive lines disposed on the substrate.

Data transmission between entities may be implemented as a form where at least two chips are connected through a bus and one chip among them transmits data to the other chip.

Two entities having connections to each other may transmit data using conductive lines based on a preset protocol.

Figure 2:
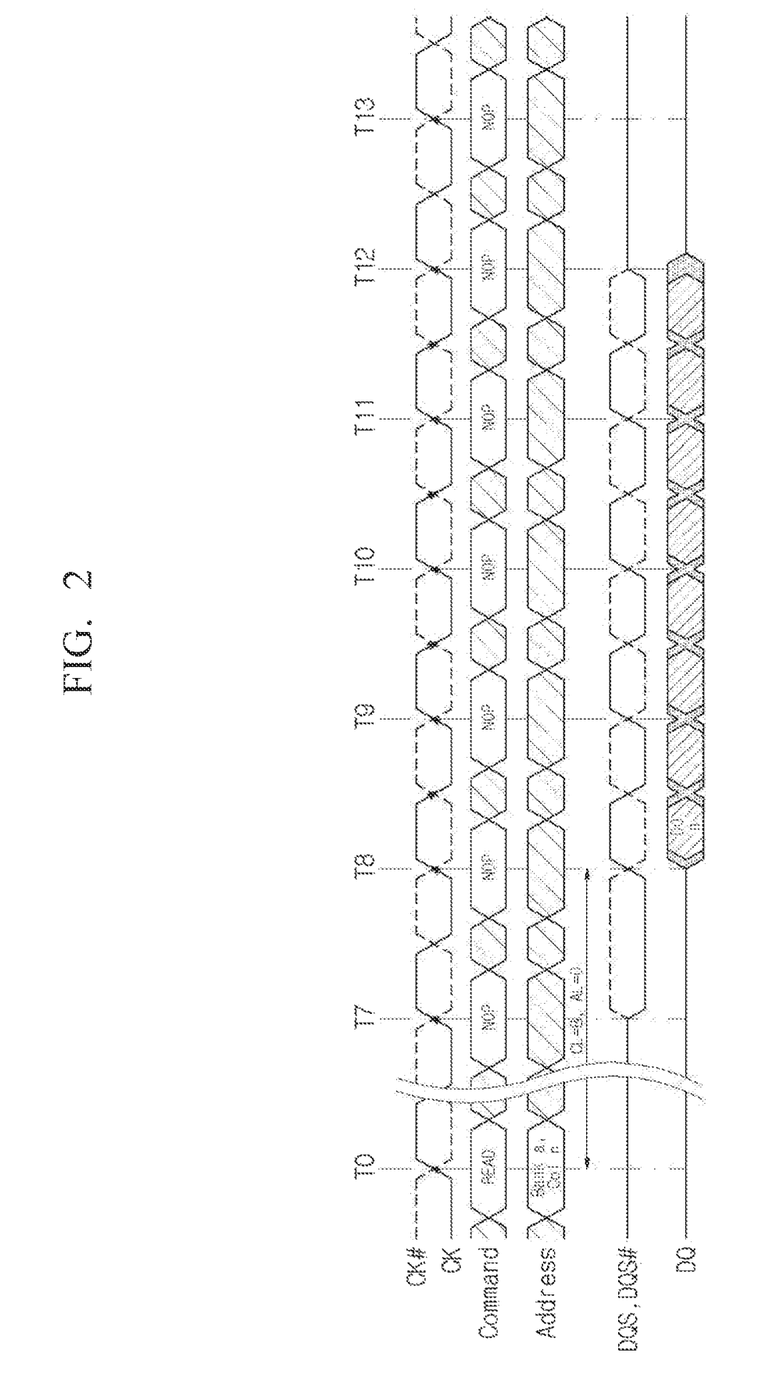
FIG. 2 is a view illustrating an example of a protocol for data transmission between entities.

FIG. 2 is a view illustrating an example of a protocol for data transmission between entities.

FIG. 2 illustrates an example of a protocol used by a first entity 10 (e.g., SDRAM controller) to read data stored in a second entity 21 (e.g., SDRAM).

Referring to FIG. 2, the first entity 10 may transmit clock CK, a command, an address, and data strobe signal DQS, and receive data DQ from the second entity 21. The first entity 10 may further transmit inverted clock CK# and inverted data strobe signal DQS#. In this case, levels of the signals required and timings of the signals are defined in the protocol.

Figure 3:
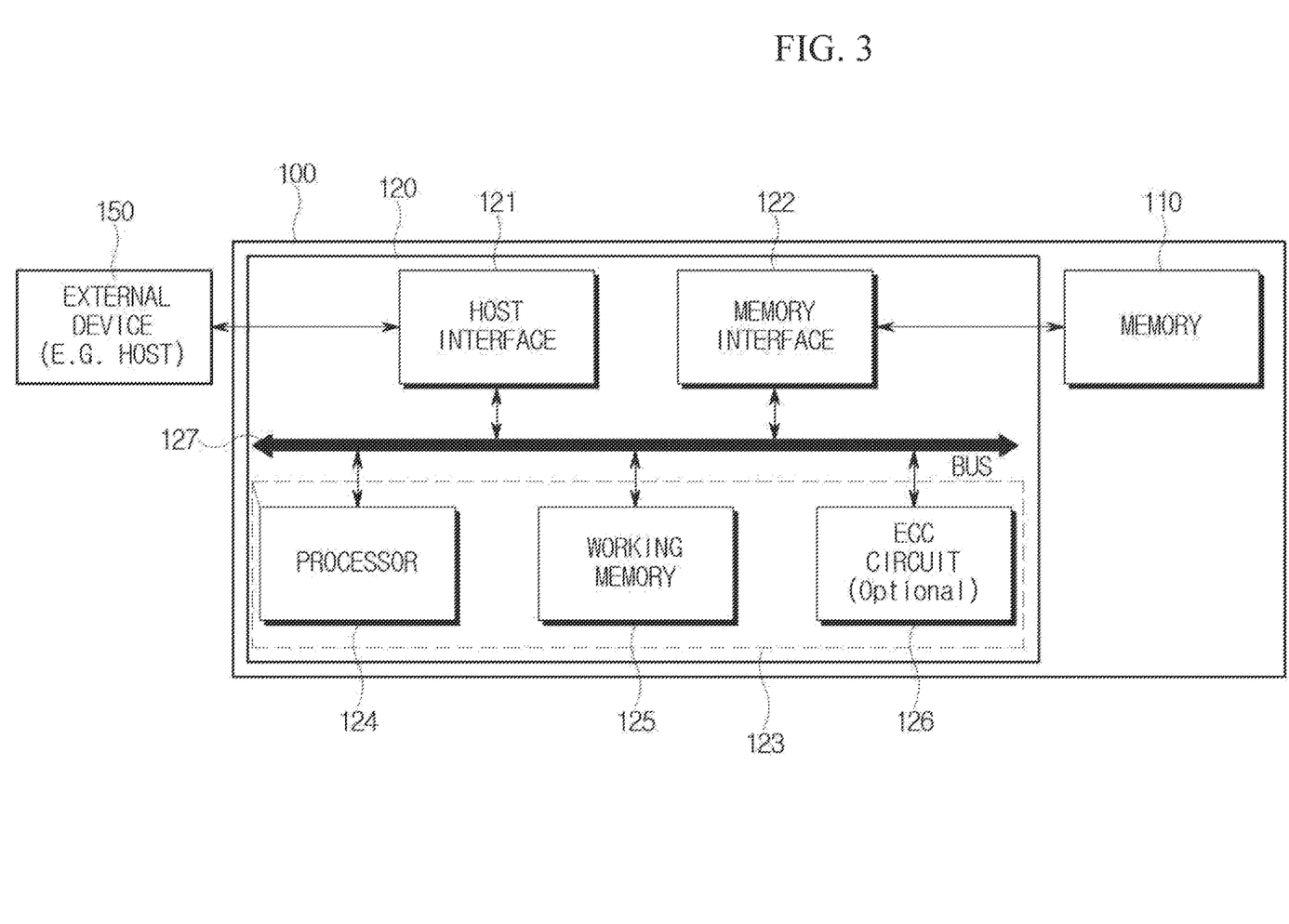
FIG. 3 is a schematic configuration diagram of a storage device.

FIG. 3 is a schematic configuration diagram of a storage device 100.

Connections between entities for data transmission may be used for all electronic apparatuses. Such connections may be configured between an external device (i.e., a host) 150 and the storage device 100 as illustrated in FIG. 3, and between a memory 110 and a controller 120 (also referred to as a memory controller). The memory 110 may be implemented with an additional chip inside the storage device 100.

Hereinafter, a data transmission technology based on connections between the memory 110 and the controller 120 will be described, however, it is apparent that such a data transmission technology may be used for all connections among electronic apparatuses or connections among a plurality of chips provided inside an electronic apparatus.

Referring to FIG. 3, the storage device 100 may include the memory 110 and the controller 120 configured to control the memory 110. Additional components may be further included in the storage device 100.

The memory 110 may operate under the control of the controller 120. The operations of the memory 110 may include, for example, a read operation, a program operation (also referred to as a "write operation"), and an erase operation.

For example, the memory 110 may be at least one of various non-volatile memories, such as a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM), and a spin transfer torque random access memory (STT-RAM).

The memory 110 may be configured with a plurality of chips or cores, and each of the plurality of chips may have a different interface for communication with the controller 120.

The memory 110 may receive a command and an address from the controller 120 through conductive lines connected to the controller 120, and access a region selected by an address, among memory cell arrays included therein. That is, the memory 110 may perform an operation instructed by a command on the region selected by the address.

The memory 110 may perform a program operation (or a write operation), a read operation, and an erase operation. For example, when performing a program operation, the memory 110 may program data into the region selected by the address. When performing a read operation, the memory 110 may read data from the region selected by the address.

When performing an erase operation, the memory 110 may erase data stored in the region selected by the address.

The controller 120 may control a program operation, a read operation, an erase operation, and a background operation with respect to the memory 110. The background operation may include one or more of a garbage collection (GC) operation, a wear leveling (WL) operation, a read reclaim (RR) operation, or a bad block management (BBM) operation.

The controller 120 may be connected to the external device (e.g., a host) 150 located outside the storage device 100, and may control operations of the memory 110 according to information (also referred to as a "command") transmitted through the conductive lines (e.g., conductive lines connecting both electronic apparatuses to each other using a cable or connector) connected to the external device 150. In addition, the controller 120 may control operations of the memory 110 regardless of a request of the external device 150.

The external device 150 may be a computer, an ultra mobile PC (UMPC), a workstation, a personal digital assistants (PDA), a tablet, a mobile phone, a smart phone, a smart wearable device, an e-book, a portable multimedia player (PMP), a portable game player, a navigation device, a black box, a digital camera, a digital multimedia broadcasting (DMB) player, a smart television, a digital audio recorder, a digital audio recorder player, a digital video recorder, a digital video player, a storage constituting a data center, one of electronic apparatuses constituting a home network, one of various electronic apparatuses constituting a computer network, or one of various electronic apparatuses constituting a telematics network, a radio frequency identification (RFID) device, and a mobile device traveling by a human control or autonomously on the ground, water surface, or in the air (e.g., vehicle, robot, drone).

Referring to FIG. 3, the controller 120 may include a host interface 121, a memory interface 122, and a control circuit 123.

The host interface 121 may provide an interface for data transmission to or from the external device 150. For example, the host interface 121 may provide an interface that provides at least one of various communication interfaces or standards such as a USB (Universal Serial Bus) protocol, a MMC (multimedia card) protocol, a PCI (peripheral component interconnection) protocol, a PCI-E (PCI-express) protocol, an ATA (Advanced Technology Attachment) protocol, a Serial-ATA protocol, a Parallel-ATA protocol, a SCSI (small computer small interface) protocol, an ESDI (enhanced small disk interface) protocol, an IDE (Integrated Drive Electronics) protocol, a SMBUS (system management bus) protocol, an I2C (inter-integrated circuit) protocol, an I3C (improved inter-integrated circuit) protocol, a proprietary protocol and the like. In another embodiment, the host interface 121 may provide an interface that is based on a multiplexed data transmission method to be described later in the present disclosure.

The memory interface 122 is connected to the memory 110 and may provide an interface for data transmission to or from the memory 110. That is, the memory interface 122 may provide an interface for data transmission between the memory 110 and the controller 120 under the control of the control circuit 123, and the interface being used for the data transmission may use a multiplexed data transmission method to be described later in the present disclosure, in addition to an existing protocol that has been used.

The control circuit 123 may receive a command through the host interface 121 and perform the received command.

The control circuit 123 may control operations of the memory 110 by performing general control operations of the controller 120. To this end, according to an embodiment, the control circuit 123 may include a processor 124 and a working memory 125, and may further include an error detection and correction circuit (ECC circuit) 126.

The processor 124 may control various operations of the controller 120.

The processor 124 may communicate with the external device 150 through the host interface 121, and communicate with the memory 110 through the memory interface 122.

The processor 124 may perform a function of a flash translation layer (FTL). The processor 124 may translate a logical block address provided by an external device into a physical block address through a flash translation layer (FTL). The flash translation layer may receive a logical block address and translate it into a physical block address using a mapping table. The logical address and the physical address may be the logical block address or the physical block address representing one memory area.

There are various address mapping methods which may be employed by the flash translation layer according to the mapping unit. General address mapping methods include a page mapping method, a block mapping method, and a hybrid mapping method.

The processor 124 may perform background functions for the memory 110 such as a garbage collection (GC), a wear leveling (WL), and a bad block management.

The processor 124 may control the operation of the controller 120 by executing firmware. The processor 124 may control operations of the controller 120 and execute (drive) firmware stored in the working memory 125 during booting. Hereinafter, an operation of the storage device 100 described in embodiments of the present disclosure may be implemented in a way the processor 124 executes firmware in which the corresponding operation is defined.

Firmware is a program executed in the storage device 100 to drive the storage device 100 and may include various functional layers. For example, the firmware may include binary data in which codes for executing each of the above-mentioned functional layers are defined.

The working memory 125 may store firmware, program codes, commands, or pieces of data used to drive the memory controller 120. The working memory 125 may include at least one of various of volatile memories such as a static RAM (SRAM), a dynamic RAM (DRAM), and a synchronous RAM (SDRAM).

In addition, the working memory 125 may serve as a device buffer to temporarily store the data to write into the memory 110 or data read from the memory 110 therein.

Therefore, a connection between the working memory 125 and the processor 124 for data transmission therebetween is needed, and the data transmission may be performed therebetween based on a method according to an embodiment of the present disclosure.

The error detection and correction circuit 126 may detect error bits of target data using an error correction code, and correct the detected error bit(s). For example, the target data may be data stored in the working memory 125, data read from the memory device 110, or the like.

A bus 127 may provide a channel between the constituent elements 121, 122, 124, 125, and 126 of the memory controller 120. The bus 127 may include, for example, a control bus for delivering various types of control signals and commands, and a data bus for delivering various types of data.

Meanwhile, some of the elements of the above-mentioned constituent elements 121, 122, 124, 125, and 126 of the controller 120 may be omitted, or some of these elements may be integrated into a single element. In this case, the memory controller 120 may also contain one or more other elements in addition to the elements identified above.

Figure 4:
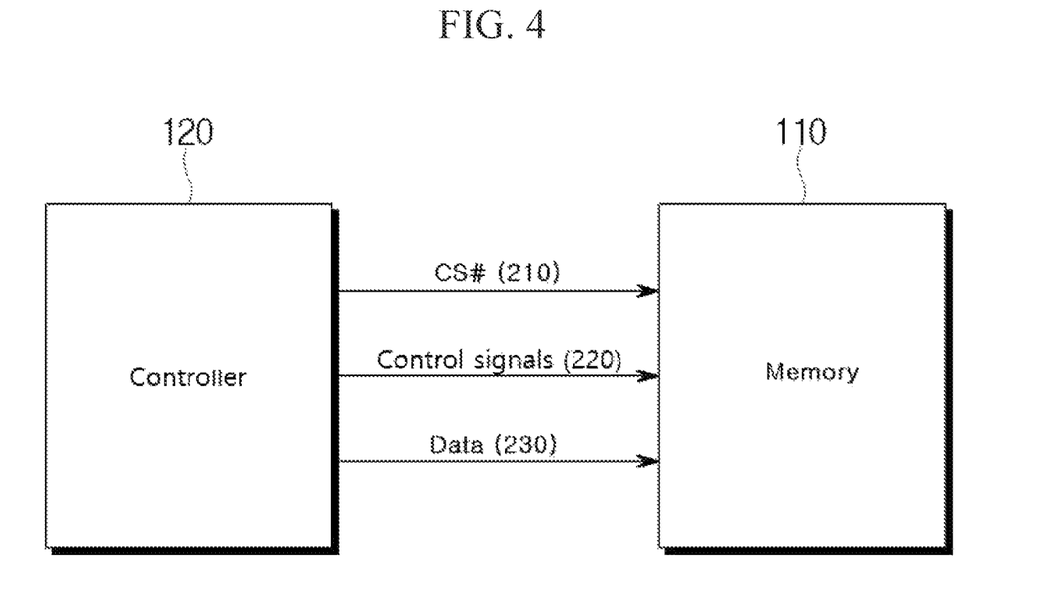
FIG. 4 is a diagram illustrating connection relations between signals used for data transmission between a controller and a nonvolatile memory according to embodiments of the present disclosure.

FIG. 4 is a diagram illustrating connection relations between signals used for data transmission between the controller and the nonvolatile memory according to embodiments of the present disclosure.

Referring to FIG. 4, the controller (or memory controller) 120 may transmit a chip select signal CS# through the first conductive line 210 to the memory 110. In addition, the controller 120 may transmit a plurality of control signals through the second conductive line 220 to the memory 110. Further, the controller 120 may transmit the data to write through the third conductive line 230 to the memory 110, or receive data read from the memory 110. Each of the conductive lines 210 to 230 may include one or a plurality of conductive lines. In addition, each conductive line may be connected to a terminal performing connection to the outside of the controller 120. Accordingly, a signal transmitted by the controller 120 may be transmitted through the terminal and the conductive line to the memory 110, and a signal transmitted by the memory 110 may reach the controller 120 through the terminal and the conductive line.

If a plurality of memories are connected to the controller 120, the chip select signal CS# may be used to select a control signal to be transmitted through the second conductive line 220 and the third conductive line 230 and a memory that receives data. The symbol # indicates that a corresponding signal is a low active signal which is ON (i.e., in a state of chip selection) when the signal is at a logic low level, and OFF (i.e., in a state of no chip selection) when a state of the signal is at a logic high level. According to an embodiment, the memory 110 may recognize the selection thereof when the memory 110 receives the chip select signal CS# having a logic low level.

The control signal may vary depending on a data transmission method of the protocol set between the controller 120 and the memory 110.

According to an embodiment, if the data transmission method is a multiplexed data transmission method which transmits or receives command, address and data in a multiplexed manner at the third conductive line 230, the control signal that is transmitted and received by the controller 120 through the second conductive line 220 may include a command latch enable (CLE) signal, an address latch enable (ALE) signal, a read enable (RE) signal, and a data strobe (DQS) signal.

The CLE signal may be a signal that allows information to be transmitted through the third conductive line 230 and be recognized as a command.

The ALE signal may be a signal that allows information to be transmitted through the third conductive line 230 and be recognized as an address.

The RE signal indicates a state where the controller 120 is able to receive data, and may be used only at the read operation.

The DQS signal may be a signal that allows the memory 110 to recognize timings of strobing data transmitted through the third conductive line 230. During the read operation, the memory 110 may generate the DQS signal and transmit it to the controller 120, and when the controller 120 transmits data to the memory 110 for writing, the controller 120 may generate the DQS signal and transmit it to the memory 110.

In another embodiment, in a data transmission method where a conductive line for address transmission and a conductive line for data transmission are provided separately, the control signals that the controller 120 transmits and receives through the second conductive line 230 may include a signal RD/WR# indicating whether a command is for a read or a write operation, an address signal for writing or reading data, a read enable (RE) signal, and a data strobe (DQS) signal. At this instance, through the third conductive line 230, only data may be transmitted.

Figure 5:
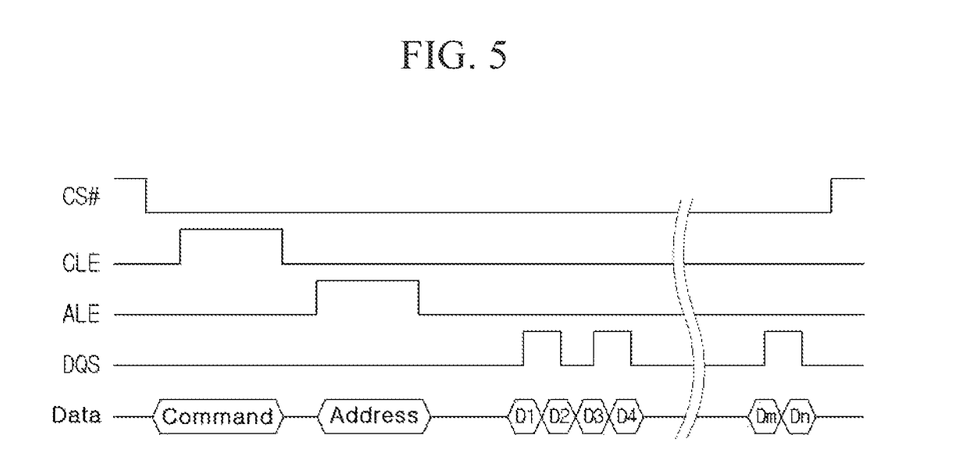
FIG. 5 is a timing diagram when transmitting data to a memory for writing data according to a multiplexed data transmission method.
Figure 6:
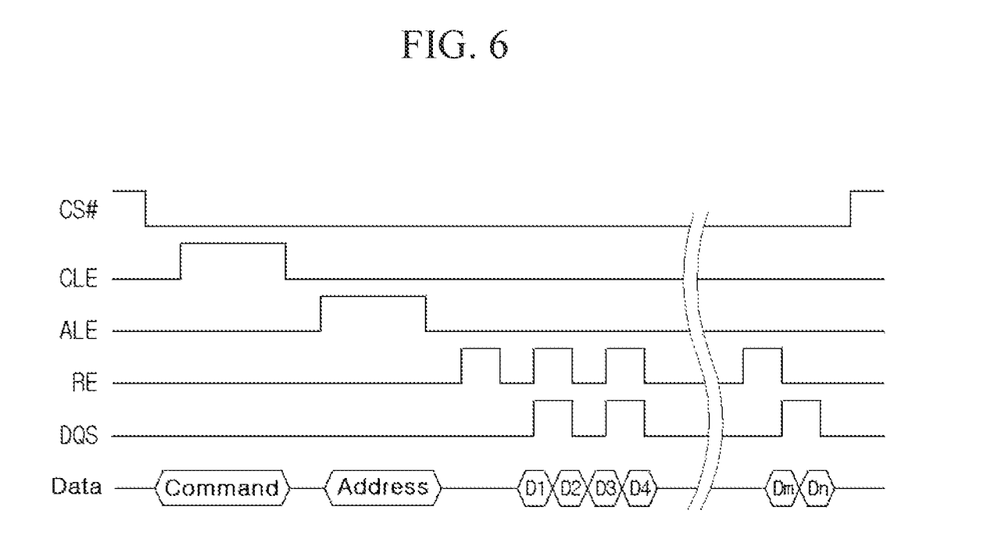
FIG. 6 is a timing diagram when reading data from a memory according to a multiplexed data transmission method.

FIG. 5 is a timing diagram when transmitting data to the memory for writing data according to a multiplexed data transmission method, and FIG. 6 is a timing diagram when reading data from the memory according to a multiplexed data transmission method.

The controller 120 may transmit a chip select signal CS# whose state is logic low through the first conductive line connected to the memory to which a command will be transmitted to indicate that the corresponding memory is selected. In addition, the controller 120 may transmit a command through the third conductive line 230 while activating a state of the CLE signal to be a logic high.

After that, in case of the data writing illustrated in FIG. 5, while toggling the DQS signal, the controller 120 may transmit a signal D1 to Dn such that data to be written into the memory can be transmitted from the third conductive line 230 at time points where a state of the DQS signal changes from logic low to logic high, and that changes from logic high to logic low.

In the case of the data read illustrated in FIG. 6, the controller 120 may indicate, to the memory 110, that the controller 120 can receive data while toggling the RE signal. The memory 110 may transmit the signal D1 to Dn such that the data read from the memory 110 can be transmitted from the third conductive line 230 at time points where a state of the DQS signal changes from logic low to logic high, and that changes from logic high to logic low, while toggling the DQS signal based on the received RE signal.

When the memory recognizes that the chip select signal CS# is activated to a state of logic low through the first conductive line 210 connected to the memory 110, the memory 110 may recognize that the subsequent control signal and data that the memory 110 receives through the second conductive line 220 and the third conductive line 230 are for the memory 110. The memory 110 may recognize a signal received through the third conductive line 230 as a command, in a state where the CLE signal is activated to a state of logic high. The command may include a memory write command or a memory read command. In addition, the memory 110 may recognize a signal received through the third conductive line 230 as an address signal, in the case where a state of the ALE signal is activated to logic high. In addition, in an example of FIG. 5, the memory 110 may recognize that the signal received through the third conductive line 230 as data D1 to Dn to write into the memory at a time point where the DQS signal changes from a state of logic low to logic high or from a state of logic high to logic low. In an example of FIG. 6, the memory 110 may recognize, from the received RE signal, that the controller 120 is ready to receive data, and may transmit a signal such that data read at a time point where the DQS signal changes from a state of logic low to logic high or from a state of logic high to logic low can be loaded at the third conductive line 230.

Referring to timing diagrams illustrated in FIG. 5 and FIG. 6, the RE signal should be toggled each time to indicate readiness to receive data, and the DQS signal should be toggled each time to indicate that there is a signal in the third conductive line 230. Change of the RE signal and/or the DQS signal by toggling each time as mentioned above may consume a significant amount of power Therefore, embodiments of the present disclosure propose a measure to reduce power consumption by suppressing toggle of the RE signal and/or the DQS signal.

Figure 7:
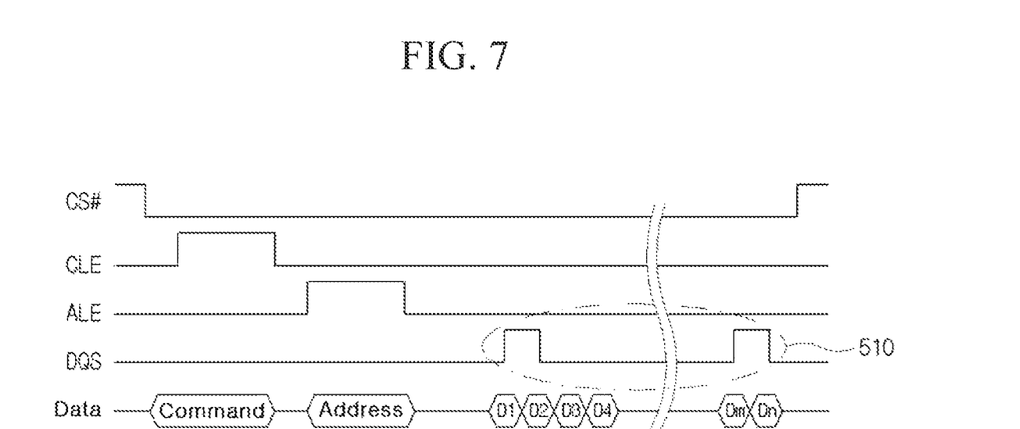
FIG. 7 is a timing diagram when transmitting data to a memory for writing data in a multiplexed data transmission method according to an embodiment of the present disclosure.
Figure 8:
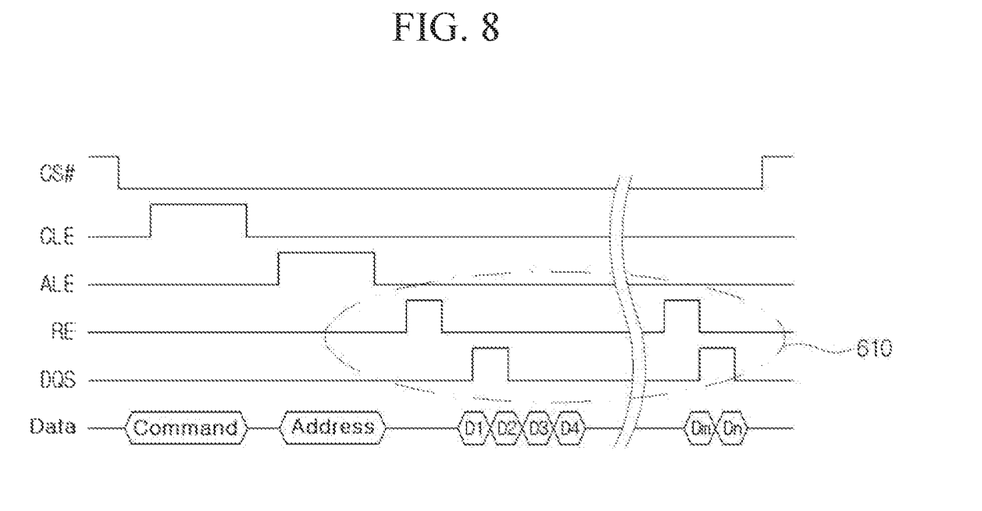
FIG. 8 is a timing diagram when reading data from a memory in a multiplexed data transmission method according to another embodiment of the present disclosure.

FIG. 7 is a timing diagram when transmitting data to the memory for writing data in the multiplexed data transmission method according to an embodiment of the present disclosure, and FIG. 8 is a timing diagram when reading data in the multiplexed data transmission method from the memory according to another embodiment of the present disclosure.

In the embodiments of FIG. 7 and FIG. 8, the multiplexed data transmission method has been taken as an example, however, the measure which will be described hereinafter may be used as it is in a method where an address connection and data connection are separately provided.

Referring to FIG. 7, the controller 120 may transmit the chip select signal CS# in a logical low state through the first conductive line 210 connected to the memory to indicate that the controller 120 intends to transmit a command to indicate that the corresponding memory is selected. In addition, the controller 120 may transmit a command through the third conductive line 230 while activating the CLE signal, which is transmitted through the third conductive line 230, to a state of logic high. The corresponding command may include a data read or data write command. Next, the controller 120 may transmit an address through the third conductive line 230 while activating the ALE signal, which has been transmitted through the second conductive line 220, to a state of logic high.

After that, in the case of data writing illustrated in FIG. 7, the controller 120 may complete data transmission through two step toggling 510 in which the DQS signal toggles once at a time point of transmitting the initial data and toggles once more at a time point of transmitting the final data, instead of toggling the DQS signal continuously.

In addition, referring to FIG. 8, in case of data read, the controller 120 may complete the data read by only toggling the RE signal once when the controller 120 is ready to receive data, and toggling the RE signal once more when the controller 120 only needs to receive the last data. In response to the above, the memory 110 may complete the data transmission only by two step toggling 610 in which the DQS signal toggles once at a time point of transmitting the data read in response to the toggling of the first RE signal to the controller 120 and the DQS signal toggles once more at a time point of transmitting the final read data to the controller 120.

Accordingly, the power consumption may be reduced since toggling of the RE signal and the DQS signal can be significantly reduced.

In the embodiments of FIG. 7 and FIG. 8, for more precise operation, the same clock frequency which is synchronized between the controller 120 and the memory 110, or the same clock frequency which is not synchronized therebetween may be used. Accordingly, a data transmission rate may be shared between the controller 120 and the memory 110.

In addition, the controller 120 may indicate a size of data to read from the memory 110 or to write into the memory 110 before start of transmission. According to an embodiment, size information of data may be included with a command, which is transmitted in advance in FIG. 7 and FIG. 8, and delivered to the memory 110.

Figure 9:
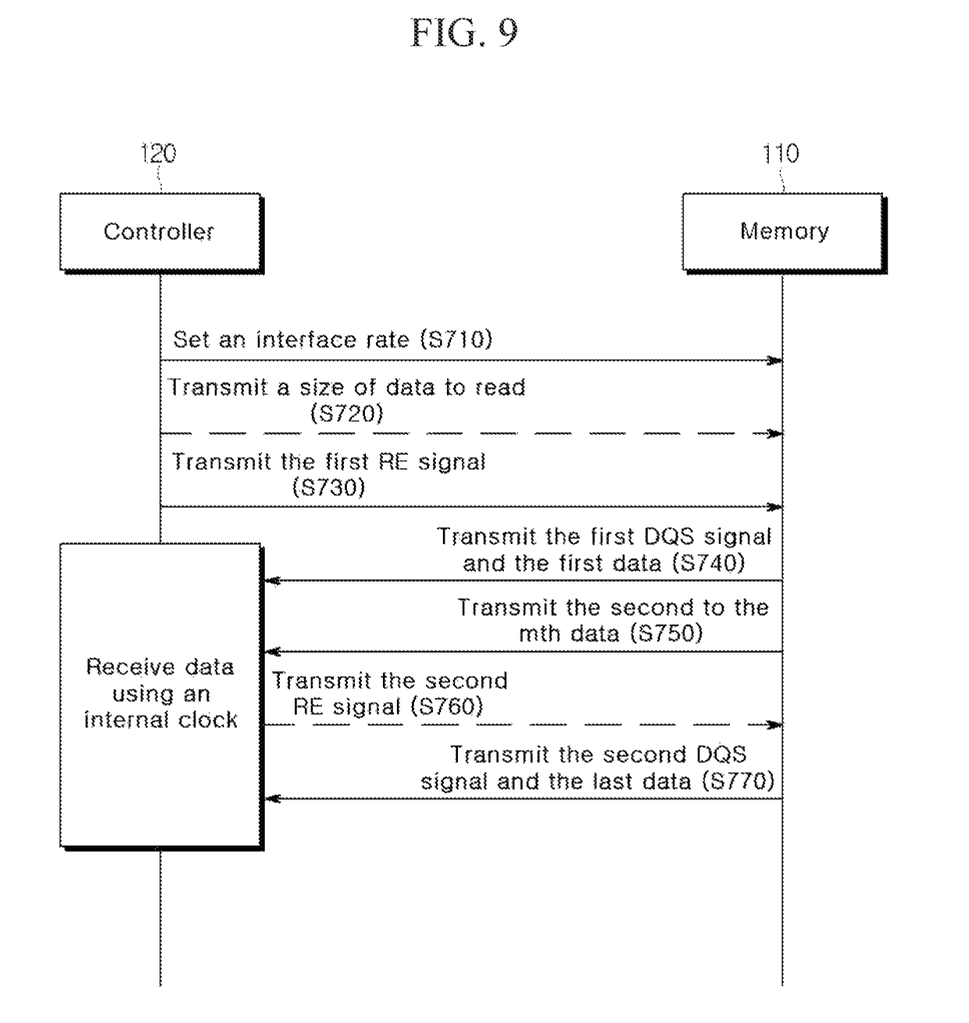
FIG. 9 is a sequence diagram illustrating operations between a controller and a memory for reading data from a memory according to an embodiment of the present disclosure.

FIG. 9 is a sequence diagram illustrating operations between the controller 120 and the memory 110 for reading data from the memory according to an embodiment of the present disclosure.

Referring to FIG. 9, the controller 120 may set an interface rate between the controller 120 and the memory 110 in operation S710. According to an embodiment, setting the interface rate may be setting a frequency of a clock to be used by the interface. According to an embodiment, the controller 120 may set the interface rate only once for the first time after power is applied thereto. In another embodiment, changing the set value based on a performance or a state of the memory may be possible.

The controller 120 may transmit a size of data to read from the memory 110 in operation S720. According to an embodiment, the controller 120 may include a size of data intended to read with a read command that will be transmitted to the memory 110. However, the controller 120 may perform the operation S720 adjunctively. Even if the operation S720 is not performed, the memory 110 and the controller 120 may recognize a size of data intended to read based on the RE signal or DQS signal that will be transmitted later.

The controller 120 may transmit the first RE signal to indicate that it is ready to receive data to the memory 110 in operation S730. According to an embodiment, the controller 120 may transmit the first RE signal when the controller can receive all of the size of data intended to read which has been set in the operation S720.

In operation S740, the memory 110 may transmit the first DQS signal and the first data based on the reception of the first RE signal. The first DQS signal may be used as a signal indicating start of the data transmission.

In operation S750, the memory 110 may transmit data only to the controller 120 without toggling the DQS signal.

In operation S760, the controller 120 may transmit the second RE signal. The second RE signal may be the one indicating that the controller is not ready to receive data, and in another embodiment, the second RE signal may be the one indicating that the controller has received a size of data intended to read, which has been set in the operation S720.

The controller 120 may omit operation S760 which transmits the second RE signal if the controller 120 has transmitted the size of the data intended to read in advance in the operation S720. In another embodiment, if the controller has not received the preset size of the data even if the size of the data to be read in advance is transmitted in the operation S720, in order to indicate the it is ready to receive the data, the controller 120 may perform the operation S760 which transmits the second RE signal to stop the data transmission by the memory 110.

In operation S770, the memory 110 may transmit the second DQS signal and the last data, if the memory 110 receives the second RE signal from the controller 120, or transmits the last data having the size received in the operation S720.

In the operations S740 to S770, the controller 120 may receive the data transmitted by the memory 110 using an internal clock. At this instance, an error may occur due to a mismatch between a reception clock and a transmission clock if the reception clock used for receiving data by the memory 110 and the transmission clock used for transmitting data by the controller 120 are not synchronized, but the possibility of an error occurrence may be eliminated by adjusting a volume of data being transmitted, or by synchronizing the reception clock and the transmission clock.

When the controller 120 receives all data transmitted by the memory 110, the read operation may be completed.

Figure 10:
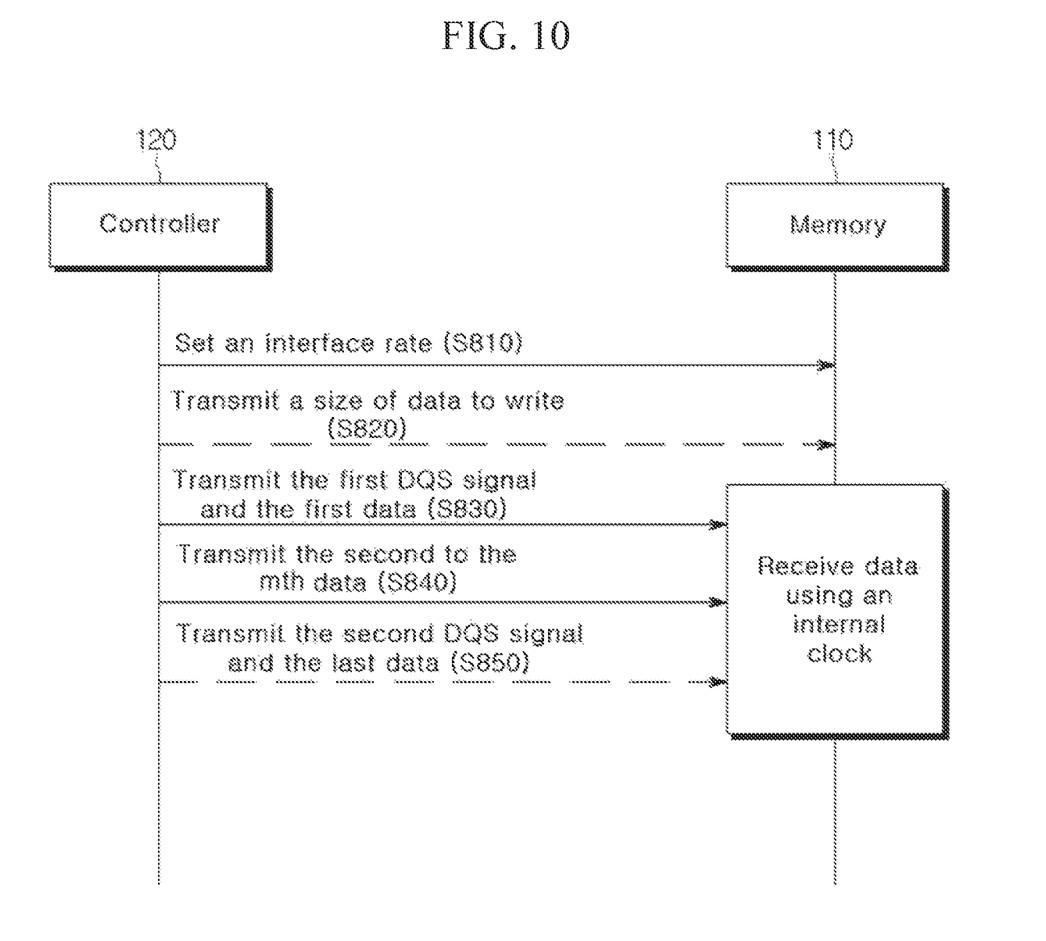
FIG. 10 is a sequence diagram illustrating operations between a controller and a memory for writing data into a memory according to another embodiment of the present disclosure.

FIG. 10 is a sequence diagram illustrating operations between the controller and the memory for writing data into the memory according to another embodiment of the present disclosure.

Referring to FIG. 10, the controller 120 may set an interface rate between the controller 120 and the memory 110 in operation S810. According to an embodiment, the setting may be setting a frequency of the clock to use in the interface. The controller 120 may set the interface rate only once for the first time after power is applied thereto, and may apply the set rate to all subsequent data reading or data writing. In another embodiment, changing the set value based on a performance or a state of the memory may be possible.

According to an embodiment, the controller 120 may set the interface rate at the data reading according to FIG. 9 and the interface rate at the data writing according to FIG. 10 differently.

In operation S820, the controller 120 may transmit the data size to write into the memory 110 to the memory 110. According to an embodiment, the controller 120 may include a size of the data to a write command that will be transmitted to the memory 110. However, the controller 120 may perform operation S820 adjunctively. Even if the operation S820 is not performed, the memory 110 may recognize a size of data intended to be written based on the DQS signal that will be transmitted later.

The controller 120 may transmit the first DQS signal and the first data in operation S830. The first DQS signal may be used as a signal indicating start of the data transmission.

In operation S840, the controller 120 may transmit data only to the memory 110 without toggling the DQS signal.

In operation S850, the controller 120 may complete the data transmission after transmitting the second DQS signal and the last data.

In operations S830 to S850, the memory 110 may receive data transmitted by the controller 120 using an internal clock. At this instance, an error may occur due to a mismatch between a reception clock and a transmission clock if the reception clock used for receiving data by the memory 110 and the transmission clock used for transmitting data by the controller 120 are not synchronized, but the possibility of the error occurrence may be eliminated by adjusting a volume of data being transmitted, or by synchronizing the reception clock and the transmission clock.

The controller 120 may complete the data writing after transmitting all data to write thereinto to the memory 110.

As described above, the method for transmitting data between the controller 120 and the memory 110 included in the storage device 110 proposed by the present disclosures may minimize power consumed by the storage device 100 by suppressing toggling that is performed at every data transmission of the DQS signal indicating presence of data in the third conductive line 230 and the RE signal indicating whether reception is available by the controller 120. The method described above may be summarized as below.

According to embodiments of the present disclosure, an electronic apparatus (e.g. controller (120) or host (150)) may comprises a first terminal connected to a first conductive line and configured to transmit, to an external device (e.g. memory (110) or storage device (100)), a read enable signal indicating whether data reception is available, a second terminal connected to a second conductive line and configured to transmit or receive, to or from the external device, a data strobe signal indicating start and end of data transmission, a third terminal connected to a third conductive line and configured to transmit or receive data to or from the external device; and an interface configured to control transmitting or receiving data to or from the external device, wherein the interface is configured to transmit, to the external device, a first read enable signal indicating whether the first terminal is ready to receive data, receive, from the external device, a first data strobe signal indicating start of data transmission through the second terminal and a first data through the third terminal at a same time, receive, from the external device, subsequent data after the first data through the third terminal, and receive, from the external device, a second data strobe signal indicating end of data transmission through the second terminal and a last data through the third terminal.

According to embodiments of the present disclosure, the interface may be configured to transmit, to the external device, a second read enable signal requesting to stop data transmission through the first terminal.

According to embodiments of the present disclosure, the interface may be configured to transmit, to the external device, a size of data to read through the third terminal before transmitting the first read enable signal.

According to embodiments of the present disclosure, a frequency of a clock used by the interface may be set to be equal to a frequency of a clock used by the external device.

According to embodiments of the present disclosure, the clock used by the interface may be synchronized with the clock used by the external device.

According to embodiments of the present disclosure, the interface may be configured to transmit, to the external device, a third data strobe signal indicating start of data to write and a first write data through the second terminal and the third terminal, transmit, to the external device, subsequent write data after the first write data through the third terminal, and transmit, to the external device, a fourth data strobe signal indicating end of write data transmission and a last write data through the second terminal and the third terminal.

According to embodiments of the present disclosure, the interface may be configured to transmit, to the external device, a size of the data to write before transmitting the third data strobe signal and the first data.

According to embodiments of the present disclosure, an electronic apparatus (e.g. controller (120) or host (150)) may comprises a first terminal connected to a first conductive line and configured to receive, from an external device (e.g. memory (110) or storage device (100)), a read enable signal indicating whether data reception is available, a second terminal connected to a second conductive line configured to transmit or receive, to or from the external device, a data strobe signal indicating start and end of data transmission, a third terminal connected to a third conductive line and configured to transmit or receive data to or from the external device and an interface configured to control transmitting or receiving data to or from the external device, wherein the interface is configured to receive, from the external device, a first read enable signal indicating whether the first terminal is ready to receive data, transmit, to the external device, a first data strobe signal indicating start of data transmission through the second terminal and a first data through the third terminal at a same time, transmit, to the external device, subsequent data after the first data through the third terminal, and transmit, to the external device, a second data strobe signal indicating end of data transmission through the second terminal and a last data through the third terminal.

According to embodiments of the present disclosure, the interface may be configured to transmit, to the external device, the second read strobe signal indicating end of write data transmission and the last write data through the second terminal and the third terminal, when the interface receives, from the external device, a second read enable signal requesting to stop data transmission.

According to embodiments of the present disclosure, the interface may be configured to receive, from the external device, a size of data to transmit through the third terminal, before receiving the first read enable signal, and control transmission of the first data strobe signal and the second data strobe signal so that data transmission by the size of data is performed.

According to embodiments of the present disclosure, a frequency of a clock used by the interface may be set to be equal to a frequency of a clock used by the external device.

According to embodiments of the present disclosure, the clock used by the interface may be synchronized with the clock used by the external device.

According to embodiments of the present disclosure, the interface may be configured to receive, from the external device, a third data strobe signal indicating start of write data transmission and a first write data through the second terminal and the third terminal, receive, from the external device, subsequent write data after the first write data through the third terminal, and receive, from the external device a fourth data strobe signal indicating end of write data transmission and a last write data through the second terminal and the third terminal.

According to embodiments of the present disclosure, the interface may be configured to receive, from the external device, a size of data to write before receiving the third data strobe signal and the first data.

According to embodiments of the present disclosure, an electronic apparatus (e.g. storage device (100)) may comprise a first entity (e.g. controller (120)) configured to perform a first function, a second entity (e.g. memory (110)) configured to perform a second function and a plurality of conductive lines connecting between the first entity and the second entity for data transmission, wherein the plurality of conductive lines comprise a first conductive line configured to transmit a read enable signal indicating whether data transmission is available, a second conductive line configured to transmit a data strobe signal indicating start and end of data transmission; and a third conductive line configured to transmit data, wherein the first entity is configured to transmit, to the second entity, a first read enable signal indicating whether the first conductive line is ready to receive data, receive, from the second entity, a first data strobe signal indicating start of data transmission through the second conductive line and a first data through the third conductive line, receive, from the second entity, subsequent data after the first data through the third conductive line and receive, from the second entity, a second data strobe signal indicating end of data transmission through the second conductive line and a last data through the third conductive line, wherein the second entity is configured to receive, from the first entity, a first read enable signal indicating whether the first conductive line is ready to receive data, transmit, to the first entity, a first data strobe signal indicating start of data transmission through the second conductive line and a first data through the third conductive line, transmit, to the first entity, subsequent data after the first data through the third conductive line and transmit, to the first entity, a second data strobe signal indicating end of data transmission through the second conductive line and a last data through the third conductive line.

According to embodiments of the present disclosure, the first entity is further configured to transmit, to the second entity, a third data strobe signal indicating start of write data transmission and a first write data through the second conductive line and the third conductive line, transmit, to the second entity, subsequent write data after the first write data through the third conductive line and transmit, to the second entity, a fourth data strobe signal indicating end of write data transmission and a last write data through the second conductive line and the third conductive line.

According to embodiments of the present disclosure, the second entity is further configured to receive, from the first entity, a third data strobe signal indicating start of write data transmission and a first write data through the second conductive line and the third conductive line, receive, from the first entity, subsequent data after the first data through the third conductive line and receive, from the first entity, a fourth data strobe signal indicating end of write data transmission and a last write data through the second conductive line and the third conductive line.

According to embodiments of the present disclosure, A method for operating an electronic apparatus, the method may comprises transmitting, to an external device, a first read enable signal indicating being whether to be ready to receive data, receiving, from the external device, a first data strobe signal indicating start of data transmission and a first data, receiving subsequent data after the first data from the external device and receiving, from the external device, a second data strobe signal indicating end of the data transmission and a last data.

According to embodiments of the present disclosure, A method for operating an electronic apparatus, the method may comprises receiving, from an external device, a first read enable signal indicating being whether to be ready to receive data, transmitting, to the external device, a first data strobe signal indicating start of data transmission and a first data, transmitting subsequent data after the first data to the external device and transmitting, to the external device, a second data strobe signal indicating end of data transmission and a last data.

According to embodiments of the present disclosure, an electronic apparatus may comprises a memory configured to store data and a controller configured to transmit sequential data and a data strobe signal to the memory, wherein the data strobe signal toggles twice corresponding to initial data of the sequential data and final data of the sequential data.

In the present disclosure, information transmission between the memory controller 120 and the memory 110 has been described as an example of the proposed method, but it is well-known by one of ordinary skill in the art that the method can be used as a measure to transmit information while reducing power consumption between any two entities between which information transmission is to be performed.

Although embodiments of the present disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims. Furthermore, the embodiments may be combined to form additional embodiments.

What is claimed is:

1. An electronic apparatus comprising:
   a first terminal connected to a first conductive line and configured to transmit, to an external apparatus, a read enable signal indicating whether data reception is available;
   a second terminal connected to a second conductive line and configured to transmit or receive, to or from the external apparatus, a data strobe signal indicating start and end of data transmission;
   a third terminal connected to a third conductive line and configured to transmit or receive data to or from the external apparatus; and
   an interface configured to control transmitting or receiving data to or from the external apparatus,
   wherein the interface is configured to:
   transmit, to the external apparatus, a first read enable signal indicating whether the first terminal is ready to receive data,
   receive, from the external device, a first data strobe signal indicating start of data transmission through the second terminal and a first data through the third terminal at a same time,
   receive, from the external device, subsequent data after the first data through the third terminal, and
   receive, from the external device, a second data strobe signal indicating end of data transmission through the second terminal and a last data through the third terminal,
   wherein the first data strobe signal becomes "1" once when transmitting the first data and thereafter becomes "0", and the second data strobe signal becomes "1" once during the transmitting of the last data and thereafter becomes "0", thereby reducing power in the first and second data strobe signals.

2. The electronic apparatus of claim 1,
   wherein the interface is configured to transmit, to the external device, a second read enable signal requesting to stop data transmission through the first terminal.

3. The electronic apparatus of claim 1,
   wherein the interface is configured to transmit, to the external device, a size of data to read through the third terminal before transmitting the first read enable signal.

4. The electronic apparatus of claim 1,
   wherein a frequency of a clock used by the interface is set to be equal to a frequency of a clock used by the external device.

5. The electronic apparatus of claim 4,
   wherein the clock used by the interface is synchronized with the clock used by the external device.

6. The electronic apparatus of claim 1,
   wherein the interface is configured to:
   transmit, to the external device, a third data strobe signal indicating start of data to write and a first write data through the second terminal and the third terminal,
   transmit, to the external device, subsequent write data after the first write data through the third terminal, and
   transmit, to the external device, a fourth data strobe signal indicating end of write data transmission and a last write data through the second terminal and the third terminal.

7. The electronic apparatus of claim 6,
   wherein the interface is configured to transmit, to the external device, a size of the data to write before transmitting the third data strobe signal and the first data.

8. An electronic apparatus comprising:
   a first terminal connected to a first conductive line and configured to receive, from an external device, a read enable signal indicating whether data reception is available;
   a second terminal connected to a second conductive line configured to transmit or receive, to or from the external device, a data strobe signal indicating start and end of data transmission;
   a third terminal connected to a third conductive line and configured to transmit or receive data to or from the external device; and
   an interface configured to control transmitting or receiving data to or from the external device,
   wherein the interface is configured to:
   receive, from the external device, a first read enable signal indicating whether the first terminal is ready to receive data,
   transmit, to the external device, a first data strobe signal indicating start of data transmission through the second terminal and a first data through the third terminal at a same time,
   transmit, to the external device, subsequent data after the first data through the third terminal, and
   transmit, to the external device, a second data strobe signal indicating end of data transmission through the second terminal and a last data through the third terminal,
   wherein the first data strobe signal becomes "1" once when transmitting the first data and thereafter becomes "0", and the second data strobe signal becomes "1" once during the transmitting of the last data and thereafter becomes "0", thereby reducing power in the first and second data strobe signals.

9. The electronic apparatus of claim 8,
   wherein the interface is configured to transmit, to the external device, the second read strobe signal indicating end of write data transmission and the last write data through the second terminal and the third terminal, when the interface receives, from the external device, a second read enable signal requesting to stop data transmission.

10. The electronic apparatus of claim 8,
    wherein the interface is configured to
    receive, from the external device, a size of data to transmit through the third terminal, before receiving the first read enable signal, and
    control transmission of the first data strobe signal and the second data strobe signal so that data transmission by the size of data is performed.

11. The electronic apparatus of claim 8,
    wherein a frequency of a clock used by the interface is set to be equal to a frequency of a clock used by the external device.

12. The electronic apparatus of claim 11,
    wherein the clock used by the interface is synchronized with the clock used by the external device.

13. The electronic apparatus of claim 8,
    wherein the interface is configured to
    receive, from the external device, a third data strobe signal indicating start of write data transmission and a first write data through the second terminal and the third terminal, receive, from the external device, subsequent write data after the first write data through the third terminal, and receive, from the external device a fourth data strobe signal indicating end of write data transmission and a last write data through the second terminal and the third terminal.

14. The electronic apparatus of claim 13,
wherein the interface is configured to receive, from the external device, a size of data to write before receiving the third data strobe signal and the first data.

15. An electronic apparatus comprising:
a first entity configured to perform a first function;
a second entity configured to perform a second function; and
a plurality of conductive lines connecting between the first entity and the second entity for data transmission,
wherein the plurality of conductive lines comprise:
a first conductive line configured to transmit a read enable signal indicating whether data transmission is available;
a second conductive line configured to transmit a data strobe signal indicating start and end of data transmission; and
a third conductive line configured to transmit data,
wherein the first entity is configured to:
transmit, to the second entity, a first read enable signal indicating whether the first conductive line is ready to receive data;
receive, from the second entity, a first data strobe signal indicating start of data transmission through the second conductive line and a first data through the third conductive line;
receive, from the second entity, subsequent data after the first data through the third conductive line, and
receive, from the second entity, a second data strobe signal indicating end of data transmission through the second conductive line and a last data through the third terminal,
wherein the second entity is configured to:
receive, from the first entity, a first read enable signal indicating whether the first conductive line is ready to receive data;
transmit, to the first entity, a first data strobe signal indicating start of data transmission through the second conductive line and a first data through the third conductive line;
transmit, to the first entity, subsequent data after the first data through the third conductive line; and
transmit, to the first entity, a second data strobe signal indicating end of data transmission through the second conductive line and a last data through the third conductive line,
wherein the first data strobe signal becomes "1" once when transmitting the first data and thereafter becomes "0", and the second data strobe signal becomes "1" once during the transmitting of the last data and thereafter becomes "0", thereby reducing power in the first and second data strobe signals.

16. The electronic apparatus of claim 15,
wherein the first entity is further configured to:
transmit, to the second entity, a third data strobe signal indicating start of write data transmission and a first write data through the second conductive line and the third conductive line;
transmit, to the second entity, subsequent write data after the first write data through the third conductive line, and
transmit, to the second entity, a fourth data strobe signal indicating end of write data transmission and a last write data through the second conductive line and the third conductive line.

17. The electronic apparatus of claim 15,
wherein the second entity is further configured to
receive, from the first entity, a third data strobe signal indicating start of write data transmission and a first write data through the second conductive line and the third conductive line;
receive, from the first entity, subsequent data after the first data through the third conductive line; and
receive, from the first entity, a fourth data strobe signal indicating end of write data transmission and a last write data through the second conductive line and the third conductive line.

* * * * *